Figure 1:
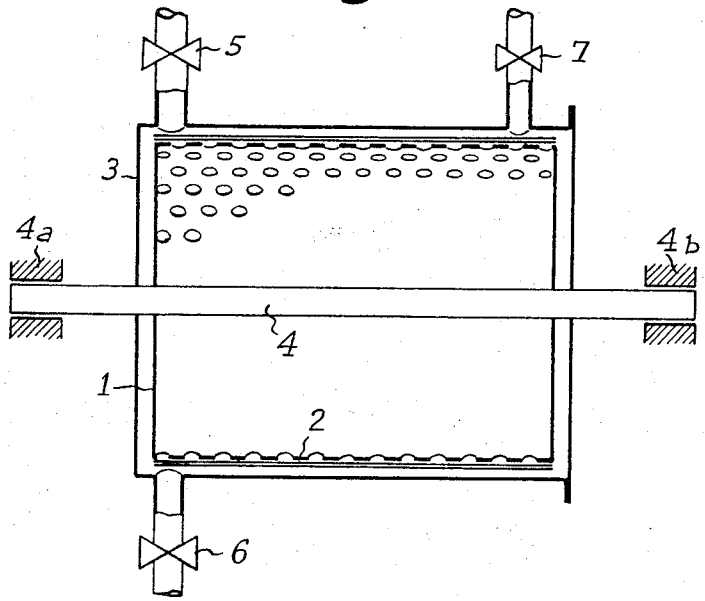

April 5, 1966 A. NICCO ETAL 3,244,477
PROCESS FOR REDUCING A HALOGENATED METALLIC COMPOUND WITH A
METALLIC REDUCING AGENT
Filed Oct. 2, 1961 2 Sheets-Sheet 2
Fig. 3
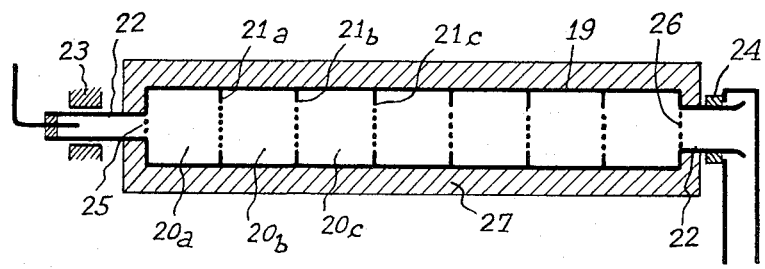
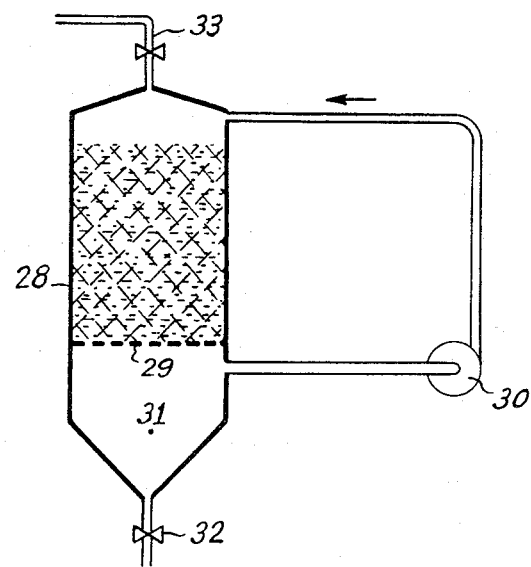
Fig. 4

United States Patent Office 3,244,477
Patented Apr. 5, 1966

3,244,477
PROCESS FOR REDUCING A HALOGENATED METALLIC COMPOUND WITH A METALLIC REDUCING AGENT
Adrien Nicco, Verneuil-en-Halatte, and Michel Laurens, Arras, France, assignors to Societe Anonyme dite: Societe Normande de Matieres Plastiques, Paris, France, a French company
Filed Oct. 2, 1961, Ser. No. 142,266
Claims priority, application France, Oct. 3, 1960, 840,119; Apr. 17, 1961, 858,909
5 Claims. (Cl. 23—87)

This invention is concerned with improvements in or relating to the process of reduction by metals or alloys.

Chemical reductions by means of metals or alloys are very common in industry; they are generally effected with finely divided metals in order to increase the surface area of contact between the reducing agent and the reaction medium which contains the compound to be reduced; however, the use of finely divided metals presents several disadvantages: these metals are very subject to surface oxidation which reduces or even suppresses their reactivity; further, if they are not oxidized, they can be pyrophoric, which presents certain dangers in the use of the process.

Furthermore the finely divided metals form a sludge with the liquid reaction medium and the solid products formed and later separation of the latter is thus often very difficult.

In the case of the reduction of transition metal halides, the use of an excess of metal reducing agent in purely divided form, for example aluminum powder, for reducing tetravalent titanium chloride, results in the metal being found again in the reaction product; such an impurity is difficult to separate, particularly in the above case where trivalent titanium chloride is obtained; moreover in this latter case the presence of aluminum powder in the reduction product is unacceptable if the trivalent titanium chloride is to be used in the constitution of catalysts for the polymerization of alpha-olefins, since the aluminum reappears in the polymer obtained, thus modifying its physical properties and its appearance.

Additionally, the reduction of transition metal halides with a deficiency of metal reducing agent can only be partially effective and, further, it can lead to the necessity of separating the reduction product from the material which has not been reduced; such a process cannot be used industrially, for the rate of reduction is very slow.

From another angle, it is preferable when trivalent titanium chloride is to be prepared for use in catalysts for the polymerization of alpha-olefins, and more particularly of ethylene, to carry out the reduction at a low temperature; however the reduction is then relatively slow and one is almost obliged to use an excess of metal reducing agent to accelerate the reaction.

Thus, in the known processes, even with a limited excess of reducing agent, a part of the latter is found in the form of finely divided particles in the reduced product. Finely divided metals are also much more expensive than the same metal reducing agents in pieces of larger size.

We have now developed an improved process for the reduction of transition metal halides in a liquid medium, under an inert atmosphere, with a metal or an alloy, which avoids or reduces the above-mentioned disadvantages.

According to the process of this invention, the metal or alloy reducing agent is present in the reaction medium, protected from air and humidity, in the form of granular pieces of which the smallest dimension is at least 0.3 mm. and the surface of these pieces in contact with the medium is continually renewed in order that it should be freed of the products of the reaction and thus maintained in a state of high reactivity, the reducing agent being in a very large excess of at least thirty times the stoichiometric quantity, with respect to the transition metal halide.

The metal or alloy reducing agents are therefore used, according to the invention, in massive form. Nevertheless, as a result of the continual renewal of their surface of contact, these metal or alloy reducing agents have a reactivity similar to and often better than that of the same metals or alloys in the finely divided state, without having the abovementioned disadvantages.

Thus partial or even total reduction can be effected without the danger of finding traces of the metal reducing agent in the reduced product, since the granular pieces of reducing agent are easily separated from the reduced products.

The reducing agent can be in various forms provided always that the smallest dimension of the pieces is at least 0.3 mm. One can for example use:

Rods of diameter $\geqslant 0.3$ mm.
Tubes of which the thickness is $\geqslant 0.3$ mm.
Metallic gauze formed of filaments of diameter $\geqslant 0.3$ mm.
Spheres of diameter $\geqslant 0.3$ mm.
Leaves or plates of thickness $\geqslant 0.3$ mm.

In all of these forms, the reducing agent has an active surface per weight of metal which is much smaller than in the forms in which reducing agents have been employed hitherto: of the order of 3 to 300 times; but this reduction in active surface area is compensated, in the process according to the invention, by the large excess of reducing agent which is from 30 to 600 times the stoichiometric quantity corresponding to total reduction. The following different values of the active surface according to the form and the dimensions of various pieces are noted in this connection:

|  | $Cm.^2/g.$ |
|---|---|
| Parallelopipeds of 3 x 3 x 5 mm. | 6 |
| Grains of diameter of 1 to 2 mm. | 12 |
| Platelets of foil of thickness 0.3 mm. | 25 |
| Spheres of diameter 0.3 mm. | 60 |
| Leaves of thickness 0.1 mm. | 75 |
| Leaves of thickness 0.05 mm. | 150 |
| Leaves of thickness 0.01 mm. | 750 |
| Flakes of 1 mm. | 7500 |
| Powder grains of diameter 0.1 mm. | 180 |
| Emulsion of grains of diameter 0.01 mm. | 1800 |

Only the four first forms are usable in accordance with the invention.

The very large excess of reducing agent has the further advantage of allowing control of the reaction temperature, because of the thermal inertia of the mass of the reducing agent.

The basic idea of the invention lies in the replacement of a very large surface area of contact between a metallic reducing agent and a reaction medium containing the compound to be reduced, by a surface area of contact which is smaller but which is constantly renewed. This smaller surface area of contact is thus as reactive at the end as at the beginning of the reaction, in contrast to reduction by finely divided metals where the larger area of contact alters in proportions to the progress of the reaction. Further, as has been shown above, the very much larger excess of reducing agent compensates for the reduction in specific active surface area, and this excess of reducing agent is immediately re-usable for further reduction processes.

As far as the characteristic dimension of the pieces of reducing agent is concerned, granular pieces of which the smallest dimension is less than 0.3 mm. could be used, but such pieces would have to be replaced after they had been used for a short time in order to avoid the risk of their use polluting the reduced product, as in the case of powders. Such replacement would increase the cost price of the process.

The process should be carried out in the absence of air and water in order to avoid all risk of oxidation of the substances present, and should preferably be carried out under an inert atmosphere, such as nitrogen.

The process can be carried out in an anhydrous liquid medium so that the reduction products do not adhere to the surface of the reducing agent. This medium can be itself the compound to be reduced, without solvent, if it is a liquid. The process can also be carried out using a solvent chosen from the following classes: saturated hydrocarbons, such as hexane, heptane, octane, cyclohexane and its derivatives, decalin and liquid paraffins: aromatic hydrocarbons, such as benzene, toluene, xylene, ethylbenzene, polyalkylbenzene, cumene, tetralin, naphthalene, diphenyl and diphenylmethane: halogenated organic compounds, such as bromobenzene, chlorobenzene, ethyl chloride and bromide, tert.-butyl chloride, benzyl chloride, tetrachloroethane, and other chloroethanes, hexachlorobenzene, chlorinated paraffins, and chlorinated naphthalene and polyphenyls.

The compounds in any one of the above classes can, of course, be mixed. Small quantities of polar compounds such as amines, alkyl ammonium chlorides, alcohols, aldehydes, ethers, ketones, acids, acid chlorides, in particular $SOCl_2$, $POCl_3$ and $PCl_5$, halogens and their hydracids, esters such as $PO(OR)_3$, alkylamides, silicones, anhydrous metal salts, in particular the chlorides of beryllium, boron, magnesium, aluminum, zinc, copper, tin and mercury, can also be added to the liquid medium. These additives alter the rate of the reaction, the state of division of the product obtained, and its reactivity.

The process of the invention may be applied generally to the transition metal halides, but especially to tetravalent titanium chloride $TiCl_4$, as well as to the following other halides: $TiBr_4$, $TiI_4$, $VCl_4$, $VOCl_3$, $VOBr_3$, $MoCl_5$, $ZrCl_4$, $MoBr_4$, $MoF_6$, $MoOF_4$, $CrO_2Cl_2$.

As metal reducing agent, aluminum is most often used but beryllium, magnesium, zinc, iron, or copper as well as the alloys and mixtures of these metals, can also be used.

Another essential advantage of the invention lies in the fact that the reduction processes in accordance with the invention can be carried out at temperatures lower than those usually necessary to start the reduction under similar conditions with finely divided metals; this lowering of the temperature at which the reduction will take place is due to the very large excess of reducing agent and to its great reactivity. The process can be carried out at temperatures of from 0 to 200° C., and preferably of from 20 to 130° C.

Any system of agitation can be used to achieve the renewal of the surface of contact of the granular pieces of the reducing agents; for instance the pieces of the reducing agent can be caused to rub against one another as in a polishing barrel by imparting a suitable movement to the whole of the reactor; in addition internal agitation can be effected in the reaction medium so as to cause friction of this medium with the pieces of the reducing agent or, more simply, circulation of the liquid mass of the medium in contact with the reducing agent can be effected. In the latter case, the renewal of the surface of the pieces of the reducing agent comes about simply by circulation of the liquid current around the pieces.

In the case where mechanical agitation within the reaction medium is used, it is preferable that the granular pieces should not be too large since then not only will the specific active surface be very small but also the mutual collisions between the pieces may produce flakes which have been shown above to have many disadvantages. It is thus advisable to limit the dimensions of the pieces to less than 30 mm., and preferably to between 0.3 and 10 mm.

To carry out the process according to the invention, apparatus can be used which comprises a cylindrical drum forming a container, inside which is enclosed the charge of metal reducing agent in granular pieces; this cylindrical drum is closed on its circular faces, while its lateral surface forms a sieve which allows the passage therethrough of liquids and fine materials in suspension, but which retains the pieces of metal reducing agent inside. This lateral surface can be formed, in particular, of a supported metal gauze, for example, by perforating the lateral wall of the drum and covering it with one or more thicknesses of metallic gauze. A convenient material to use for the drum and the metallic gauze is stainless steel, but the use of any other material having similar or equivalent properties is equally possible.

The drum containing the metal reducing agent may be placed inside a closed cylindrical reactor and continually rotated or alternated about a horizontal axis. The rotation may be achieved, for example, in two ways. Thus the reactor may itself be rotated taking the drum with it, the drum being fixed rigidly to the reactor, or else rolling inside it, the supply and removal of products to the reactor being either through the hollow axes of rotation of the reactor or through connections made when the rotation has stopped. Alternatively the reactor is fixed and the drum turns inside it.

In both cases the drum is at least half full of reducing agent and is rotated at a speed less than $\omega=\sqrt{g/r}$ where $\omega$ is the angular speed of rotation, $g$ is the acceleration of gravity and $r$ the radius of the drum. In both cases also, the reactor is partially filled with the solution forming the reaction medium, the maximum level being half way up the reactor in order that rotation may produce intensive circulation of the liquid in the drum.

To carry out the invention a reactor comprising a cylindrical body of stainless steel provided with a welded bottom and a cover sealed tight by an autoclave system provided with a conduit which can be closed, for the introduction of liquid reagents and the evacuation of the reaction products, can also be used.

The reactor is filed with granular pieces of metal or alloy reducing agent in the form, for example, of pieces of rod, to which may also be added, if desired, hard inert bodies, such as small spheres of stainless steel, to help in the renewal of the surface of the reducing agent.

Having completed this filling, the apparatus is purged of air by exhausting it and filling it with nitrogen, this operation being repeated several times to remove all oxygen. The anhydrous liquid in which the reaction is to take place is then introduced through the conduit, the apparatus is then raised to a suitable temperature and then set in motion on its bearings to cause rotary motion about its axis of revolution.

In order that the invention may be more fully understood, the following examples are given by way of illustration only.

*Example 1*

2 kg. of aluminum having a purity of 99.5% were introduced into a reactor having a capacity of 4 cubic decimetres and the height and diameter of which were equal; the aluminum was in the form of fragments 15 mm. long obtained from a rod of 10 mm. diameter. After purging the apparatus of oxygen as described above, 1.5 cubic decimetres of heptane and then 33 cc. (or 300 millimoles) of titanium tetrachloride were introduced. The apparatus was rotated for 21 hours at a temperature of about 20° C. at a rate of 60 revolutions per minute; the liquid phase which was in the form of a brown suspension was then separated. Analysis showed that 47% of the tetravalent titanium had been converted into trivalent titanium, the rest of the titanium remaining in the tetravalent form.

Example 2

The same reactor as in Example 1 was filled with aluminium and purged as described in Example 1; 0.5 cubic decimetre and 33 cc. of tetravalent titanium chloride (300 millimoles) were introduced into the reactor. After 17 hours of rotation of the apparatus at a rate of 60 revolutions/minute and at a temperature of 25° C., the volume was made up to 1 cubic decimetre with cyclohexane and a brown suspension of trivalent titanium chloride was separated. Analysis showed that 50% of the tetravalent titanium had been converted into trivalent titanium, the rest of the titanium remaining in the tetravalent form.

Example 3

The same reactor as in the foregoing examples was filled under the same conditions and was operated as described in Example 2 with the difference that 1 g. of zinc chloride was added to the medium. The effect of this addition was a more complete reduction; a black suspension characteristic of the presence of divalent titanium was obtained. Analysis of the suspension showed a considerable deficit of titanium which had become fixed on the aluminum. Initially there were 300 millimoles of tetravalent titanium and only 100 millimoles remained; there were also obtained 30 millimoles of trivalent titanium by oxide reduction, the divalent titanium being estimated as if it were trivalent titanium.

After reaction, the aluminum employed was washed with water and then attacked with hydrochloric acid; 120 millimoles of titanium were present in the acidic solution. It can therefore reasonably be supposed that the reduction had been carried out partially as far as the obtention of metallic titanium which had become fixed on the aluminum.

An analogous result was obtained by the use of mercuric chloride in place of zinc chloride.

Example 4

The same reactor was used as in the foregoing examples and the reaction was carried out as described in Example 1 with the exception that aluminum having a purity of 99.99% and in the form of rods 7 mm. long cut from a 3 mm. diameter filament was used. The apparatus was rotated for 21 hours while maintaining the temperature at about 20° C.; the reaction medium consisted of 0.5 cubic decimetre of gasoline containing 3 g. of dimethyl silicone (product known under the designation S.I. 200 and sold by Societe Rhone-Poulenc) and 33 cc. (300 millimoles) of tetravalent titanium chloride. Brown trivalent titanium chloride was obtained with a conversion rate of 80%, the rest of the titanium being in the tetravalent form; the addition of silicone thus improves the yield of the reduction.

Example 5

In the following examples the reactor employed in the foregoing examples was not used, but a flask of 2 cubic decimetre capacity provided with an internal mechanical agitator which could be rotated at 100 revolutions/minute.

Into this flask were introduced 300 g. of aluminum having a purity of 99.99% and in the form of cylindrical pieces of 3 mm. diameter and 7 mm. long. The flask was purged by first exhausting it and then filling it with nitrogen. 200 cc. of ethylbenzene heated to 130° C. and 450 millimoles of tetravalent titanium chloride were then introduced. The reaction was allowed to proceed for an hour with agitation at 130° C.; after which the reaction mixture was cooled by introducing into the flask 1.5 cubic decimetres of cold ethylbenzene and a suspension of trivalent titanium chloride having a red-violet color was obtained. The suspension, after separation, was completely free of metallic aluminum and analysis showed that it contained 400 millimoles of trivalent titanium chloride.

Example 6

Into a flask identical with that used in Example 5, were introduced 300 g. of aluminum having a purity of 99.99% and in the form, as in the preceding example, of cylindrical pieces of 3 mm. diameter and 7 mm. long. After purging the flask and filling it with nitrogen, 200 cc. of ethylbenzene at 40° C. and 410 millimoles of tetravalent titanium chloride were introduced. The reaction was allowed to take place for one hour with agitation at 40° C. After separation of the suspension, 320 millimoles of trivalent titanium chloride completely free from metallic aluminum were obtained.

Example 7

A similar result to that of Example 6 was obtained by replacing the ethylbenzene by toluene.

Example 8

A flask similar to that described in Example 5 was used and the reaction was carried out as in Example 5 except that technical octane was used as the solvent instead of ethylbenzene and the temperature was 120° C. in place of 130° C. After stopping the reaction, 150 millimoles of red-violet trivalent titanium chloride were obtained.

It is clear, therefore, ethylbenzene and toluene enable a much faster reaction rate to be obtained than that obtained with octane so that the reaction takes place without it being necessary to agitate; in the case of ethylbenzene and toluene, the TiCl$_3$ powder separates itself from the aluminum.

Example 9

The apparatus used is shown diagrammatically in FIGURE 1 of the accompanying drawings.

Referring to FIGURE 1, the apparatus comprises a drum 1 of stainless steel having a lateral wall 2 which is perforated and covered with two layers of 60 mesh stainless steel gauge, which corresponds substantially to openings of 0.2 mm. The drum 1 is positioned within a reactor 3 also formed of stainless steel and the drum and the reactor are both fixedly mounted on a horizontal spindle 4 carried by bearings 4a and 4b.

The capacity of the reactor 3 is 10 cubic decimetres and its external diameter is 25 cm.; the free space between the drum 1 and the reactor 3 is reduced to the minimum. Valved openings 5 and 6 are provided in the reactor 3 for the introduction and removal respectively of products; an opening 7 also provided with a valve, enables an inert gas to be introduced into the reactor.

The drum 1 was charged with 5 Kg. of pieces of art aluminum filament having the dimensions 0.5 x 0.5 x 5 mm.; the apparatus was closed, dry nitrogen was introduced and then, in the absence of air and at 20° C., 500 cc. of dry toluene 1 cubic decimetre of heptane and 285 g. of TiCl$_4$ were added. The inlet conduits were closed and the apparatus was rotated at a rate of 60 revolutions per minute for 24 hours. A brown suspension in which 95% of the initial TiCl$_4$ had been reduced to TiCl$_3$ was removed through the outlet conduit. The pieces of aluminum were practically intact and they could be reused for another reduction reaction.

Comparative examples in which the excess of aluminum and the form in which it is used were varied, were carried out under the same conditions.

With pieces of 0.5 x 0.5 x 5 mm. and all other conditions being the same, the following yields $r$ were obtained as a function of the excess of aluminum employed:

Stoichiometric quantity, i.e. 13.5 g.: $r<1\%$
Excess of 37 times, i.e. 500 g.: $r=29.5\%$
Excess of 74 times, i.e. 1 Kg.: $r=66\%$
Excess of 370 times, i.e. 5 Kg.: $r=95\%$.

Still under the same conditions, the pieces of aluminum were replaced by flakes of 0.05 mm. thickness and the following yields $r$ were obtained:

Stoichiometric quantity, i.e. 13.5 g.: $r<50\%$
Excess of 11 times, i.e. 150 g.: $r=90\%$ In the latter two cases, even though the reduction was only partial, the suspension obtained was charged with very fine pieces of aluminum which were very difficult to separate.

It is thus experimentally established that in the known processes, even if the reducing agent is not used in excess, which is nearly always necessary, the reducing agent is nevertheless present in very fine pieces in the product of the reduction.

On the other hand, the excess of reducing agent in the process according to the invention does not prevent any disadvantages if facilities for separation are available and, moreover, this excess can be re-used for other reductions.

Experiments were also carried out using $TiBr_4$, in one case, and $TiI_4$, in another, in place of $TiCl_4$ and in both cases suspensions of $TiBr_3$ and $TiI_3$, respectively, were obtained in a similar manner to that leading to $TiCl_3$.

*Example 10*

The apparatus described in Example 9 was used with the same charge of aluminum as that mentioned in that example and 1.5 cubic decimetres of cyclohexane, 100 cc. of ethylbenzene, 20 g. of dimethyl silicone, 285 g. of $TiCl_4$, 20 g. of benzyl chloride and 5 g. of anhydrous zinc chloride were introduced in the absence of air. After 12 hours of rotation at 20° C., a clear brown suspension was recovered in which 55% of the $TiCl_4$ had been reduced to $TiCl_3$. The quantities of silicone, benzyl chloride and zinc chloride could be modified; the reduction rate increased with the quantity of benzyl chloride, while it decreased when the quantity of silicone was doubled; zinc chloride, on the other hand, did not greatly influence the reduction rate but modified the properties of the final reduced product.

When the 20 g. of benzyl chloride were replaced by 20 g. of tertiary butyl chloride, the reduction took place in a similar manner.

*Example 11*

The apparatus described in Example 9 was used with the same charge of aluminum as that mentioned in that example and 1.5 cubic decimetres of ethylbenzene, 20 g. of phenylmethyl silicone and 290 g. of $VCl_4$ were introduced in the absence of air. After 12 hours of rotation at 20° C., a very dark suspension containing $VCl_2$ and no $VCl_4$ was recovered.

$VCl_4$, $MoCl_5$, $VOCl_3$, $VOBr_3$, $ZrCl_4$, $MoBr_4$, $MoF_6$, $MoOF_4$ and $CrO_2Cl_2$ could equally be reduced by this procedure under similar conditions to those of the reduction of $TiCl_4$; the reduction products were suspensions of compounds in which the valency of the transition metal was reduced to a lower value; these suspensions were utilizable as Ziegler catalyst constituents.

*Example 12*

Figure 2:
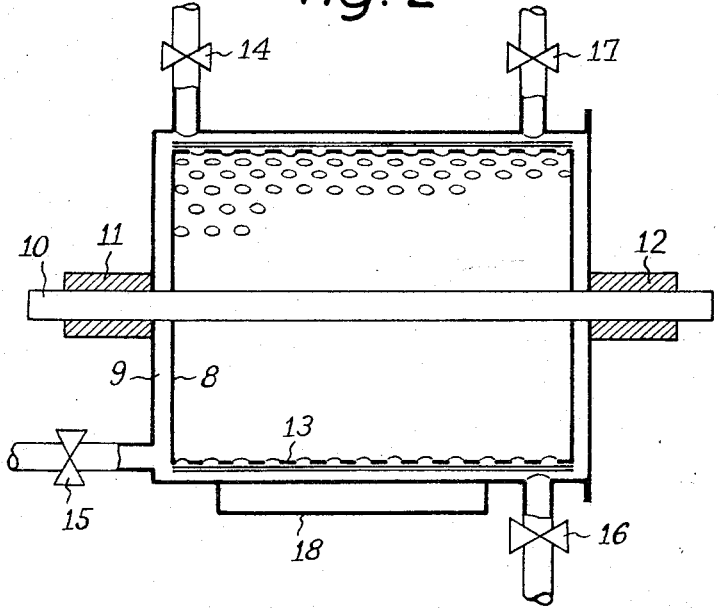

The apparatus illustrated diagrammatically in FIGURE 2 of the accompanying drawings was used.

Referring to FIGURE 2, the apparatus comprises a drum 8 and a reactor 9 of stainless steel; the reactor 9 is fixed and the drum 8 is mounted on a spindle 10 carried by bearings 11 and 12. The reactor 9 has a capacity of 10 litres and an external diameter of 25 cm. The lateral wall 13 of the drum 8 is perforated and covered with a stainless steel gauze. The reactor is provided with valved conduits 14, 15 and 16 for the supply and removal of products, and with a valved conduit 17 for the introduction of inert gas into the reactor. A double jacket 18 enables the temperature of the reactor, which is preferably insulated, to be readily controlled.

The drum was charged with 5 kg. of aluminum in the form of large, non-porous, grains of approximately spherical shape and of such dimensions that they were retained by a 16 sieve (openings of about 1 mm.) and passed through a 9 sieve (openings of about 2.2 mm.). The apparatus was closed, filled with dry nitrogen, and 1.5 cubic decimetres of hexane, 100 cc. of toluene, 5 g. of mercuric chloride, 5 cc. of ethyl bromide and 285 g. of $TiCl_4$ were introduced in the absence of air. The drum was rotated for 12 hours at a rate of 60 revolutions per minute while maintaining the temperature between —5 and 0° C. A brown suspension of $TiCl_3$ still containing $TiCl_4$ was recovered. The proportions of ethyl bromide and of $HgCl_2$ could be considerably varied without modifying the result.

*Example 13*

Example 12 was repeated with the exception that the mercuric chloride was replaced by 3 cc. of anhydrous stannic chloride and the ethyl bromide was replaced by 3 cc. of ethyl chloride. The result of the reduction was similar, but the results differed as far as the employment of these suspensions of $TiCl_3$ as constituents of catalysts for ethylene polymerization, is concerned.

*Example 14*

The apparatus described in Example 12 was connected by the valved outlet 16 to a device for separation of the solid phase by decantation, centrifugation, filtration or other convenient process. The liquid freed of solid in suspension was returned through the inlet 15 into the reactor 9. It was thus possible to feed the reactor continuously with the solution to be reduced and to recover continuously the concentrated suspension at the stage where the separation was effected. Under these conditions it was possible when the steady state of the continuous process was attained, to effect the reduction in a liquid medium of constant composition and to improve the uniformity of the products obtained.

With the apparatus connected as above described and containing a charge of aluminum similar to that described in Example 12, 1 cubic decimetre of liquid paraffin (boiling above 150° C.), 500 cc. of toluene, 20 g. of dimethyl silicone and 285 g. of $TiCl_4$ were introduced in the absence of air. The circuit of the apparatus for separation of the product in suspension was initially filled with a mixture of liquid paraffin and $TiCl_4$ in the same proportion as mentioned above. The drum 8 was rotated for 5 hours while the temperature was maintained at 20° C., then withdrawal from the separation apparatus of a concentrated suspension containing about 0.9 mole/cubic decimetre of $TiCl_3$ and 0.6 mole/cubic decimetre of $TiCl_4$ was commenced; simultaneously the reactor was supplied, through the conduit 14, with 0.2 cubic decimetre/hour of a mixture of the following composition:

| | | |
|---|---|---|
| Liquid paraffin | cubic decimetre | 0.8 |
| Toluene | do | 0.2 |
| Dimethyl silicone | g | 10 |
| $TiCl_4$ | g | 285 |

Withdrawal was effected with an output which maintained a constant level in the reactor. The process rapidly reached a steady state enabling 4 to 5 moles of $TiCl_3$ in concentrated suspension to be produced per 24 hours. By modifying the concentration of $TiCl_4$ in the feed solution, its supply, and consequently the output and the withdrawal, the proportion of $TiCl_3$ and $TiCl_4$ in the recovered suspension could be modified.

*Example 15*

The apparatus described in Example 12 was used in a discontinuous manner with a charge of 5 kg. of an aluminum-beryllium alloy containing 20% of beryllium in the form of pieces having the dimensions 2 x 2 x 5 mm. 1.5 cubic decimetres of xylene were introduced in the absence of air. The temperature was raised to 130° C. and 285 g. of TiCl₄ were introduced. After 6 hours of rotation, a red-violet suspension of TiCl₃ was recovered. The use of a beryllium alloy was motivated by the fact that beryllium influences the stereospecificity of TiCl₃ when the latter is used in the constitution of a catalyst for the polymerization of alpha-olefins; the proportion of beryllium could be modified without disadvantage. Lithium, magnesium or sodium could also be alloyed with the aluminum in a similar manner; in each of these different cases the reduction was carried out under the same conditions.

*Example 16*

The apparatus described in Example 12 was used with a charge of aluminum identical to that mentioned in said example. In the absence of air, 1.5 cubic decimetres of decalin, 100 cc. of tetralin and 20 g. of beryllium chloride were introduced into the reactor. The temperature was raised to 190° C. and 285 g. of TiCl₄ were introduced. After 2 hours of rotation at 180–190° C., 100% reduction was obtained. The reaction mixture was cooled under nitrogen and a violet suspension of TiCl₃ was recovered. The quantity of BeCl₂ could be modified without causing a noticeable modification.

*Example 17*

The apparatus described in Example 9 was used under the following conditions: the drum was charged with 3 kg. of magnesium in grains of 1 to 3 mm. diameter and 1.5 cubic decimetres of heptane and 285 g. of TiCl₄ were introduced into the reactor, the reactor was then filled with an atmosphere of anhydrous hydrogen chloride which has the effect of accelerating the rate of reduction and the openings were closed. After 24 hours of rotation at 20° C., a black suspension containing TiCl₂ was recovered under nitrogen.

The magnesium used as reducing agent can be alloyed with other metals. Similarly the quantity of HCl can be greately varied and the HCl can be replaced by HBr or even by Cl₂ or Br₂ without changing the nature of the results.

*Example 18*

Example 17 was repeated using 6 kg. of zinc in pellets of about 5 mm. diameter in place of the magnesium and, after 24 hours of rotation of the apparatus at 20° C., a black suspension containing TiCl₂ was obtained.

*Example 19*

The apparatus described in Example 9 was used with a charge of 5 kg. of aluminum in grains of 2 to 3 mm. diameter and 0.5 kg. of copper in rods of 1 x 1 x 5 mm. 1.5 cubic decimetres of cyclohexane, 100 cc. of toluene, 10 g. of ethyl bromide and 285 g. of TiCl₄ were introduced into the reactor. After rotation for 12 hours at 20° C., a brown suspension in which 60% of the initial TiCl₄ had been reduced to TiCl₃, was obtained. The copper has the effect of accelerating the reduction and modifying the molecular weight of the polyethylene obtained by using this suspension of TiCl₃ as a catalyst constituent. The quantity of copper can be varied and other metals can be employed in its place, such as Be, Mg, Zn, Fe, Ni and Co without the result of the reduction being modified.

*Example 20*

The apparatus of Example 9 was used with a charge of 5 kg. of aluminum in grains of 2 to 3 mm. diameter. 1 cubic decimetre of cyclohexane, 500 cc. of toluene, 17.5 g. of BCl₃ and 285 g. of TiCl₄ were introduced into the reactor. After rotating for 24 hours at 20° C., a brown suspension in which 98% of the TiCl₄ had been reduced to TiCl₃, was obtained. When the quantity of BCl₃ was modified, there was a variation in the results obtained both with regard to the rate of reduction and the catalytic properties of the product obtained.

*Example 21*

The apparatus described in Example 9 was used with a charge of 5 kg. of aluminum-copper alloy containing 5% of copper in pieces of 1 x 1 x 5 mm. 1.5 cubic decimetres of cyclohexane, 100 cc. of toluene, 10 g. of AlCl₃ and 285 g. of TiCl₄ were introduced into the reactor. After rotating for 6 hours at 20° C., a brown suspension in which 55% of the TiCl₄ had been reduced to TiCl₃, was obtained. Alloys containing various proportions of copper, zinc, vanadium, chromium, iron, nickel, cobalt, silver, cadmium, tin, and mercury can also be employed; the reduction is effected in the same manner and the products obtained differ only in their properties.

*Example 22*

The apparatus described in Example 12 was used with a charge of aluminum in pieces of 3 x 3 x 10 mm. and 1.7 kg. of TiCl₄. The temperature was raised to 135° C. and 10 cc. of ethyl benzene were introduced. The reaction commenced and at the end of 2 hours of rotation, a thick paste the color of wine dregs was obtained; this paste was a concentrated suspension of TiCl₃ in excess TiCl₄. The reduction could also be continued to a very advanced stage but it is then necessary to have suitable means for recovering the powder obtained.

All the other materials cited and employed as solvent or as additives can be employed in place of the ethylbenzene mentioned above, in particular halogenated compounds and alkylated aromatic hydrocarbons, and give analogous results.

*Example 23*

The apparatus illustrated diagrammatically in FIGURE 3 of the accompanying drawings was used.

Referring to FIGURE 3, the apparatus comprises a cylindrical tube 19 of stainless steel which can be rotated about its axis and which is internally divided into compartments 20a, 20b, 20c . . . by partitions 21a, 21b, 21c . . . which are perforated with openings of diameter equal to about half that of the tube 19; these openings are closed by metallic gauzes sufficiently fine to form sieves which allow liquids and very fine solids to pass. They may consist, for example, of 60 mesh stainless steel gauze.

The tube 19 has axial extensions 22 at each end which act as spindles and are mounted in bearings 23 and 24. Starting materials are introduced into the tube 19 through the left hand extension (as seen in the figure) and pass through the entry sieve 25 into the compartment 20a, while products pass through the exit sieve 26 to the right hand extension 22.

The compartments are thus passed through successively by the suspension to be reduced; each compartment comprises a lateral opening for the introduction of the metal reducing agent and/or a crushing charge. The tube 19 also comprises a fixed thermally insulating covering 27 provided, if desired, with heating means such as electric resistances.

This apparatus was used in a continuous manner to reduce TiCl₄ to TiCl₃ in a yield of more than 98% and to crush the TiCl₃ obtained. The tube 19 comprising 8 compartments, the first six from the point of entry of the starting material were filled to mid-height with pieces of aluminum of 2 to 5 mm., while the last two in which grinding of the reduction product was to be effected, were filled to mid-height with stainless steel balls of 5 mm. diameter. The tube 19 having a diameter of 25 cm. was rotated at a suitable rate of about 60 revolutions/minute and its temperature was raised to 180° C. It was continuously supplied with a mixture of the following composition:

Decalin _____ 1 cubic decimetre.
TiCl₄ _____ 500 ccs., i.e. 4.5 moles.
Tricresyl phosphate _____ 350 ccs., i.e. 1 mole.

The rate of supply was 500 ccs./hour which gave a total residence time of about 20 hours. After 24 hours operation, a sufficiently regular output of the system consisting of a very thick suspension in which less than 2% of the initial TiCl₄ was unreduced, was obtained. This suspension was subjected to a grinding action by the pieces of aluminum and then by the stainless steel balls and could be used directly as a component of a polymerization catalyst for propylene, for example. All other conditions being the same, the carrying out of this procedure without the addition of tricresyl phosphate led to a suspension in which 35% of the initial TiCl₄ had not been reduced.

Tricresyl phosphate can be used in a different proportion from that mentioned above and it can be replaced, for example, by hexamethyl phosphoramide, diphenyl, naphthalene, chlorinated paraffin or benzamide, the reduction being effected in each case in a similar fashion and the proportion of unreduced TiCl₄ in the product obtained varying by only a few percent.

*Example 24*

The apparatus shown diagrammatically in FIGURE 4 of the accompanying drawing was used.

Referring to FIGURE 4, the apparatus comprises a reactor 28 containing a metallic gauze 29 designed to support the subdivided reducing agent. A pump 30 effects circulation of the reagents in solution or suspension through the reducing agent. A chamber 31 in the reactor and below the mesh 29 and provided with a valved outlet conduit 32, enables decantation of the reaction products and their removal to be effected. The top of the reactor 28 is provided with a valved inlet conduit 33 for the introduction of starting materials.

This apparatus was used in a continuous process. The reactor 28 was charged with 20 kg. of aluminum, closed and filled with dry nitrogen. A mixture of the following composition was introduced into the circuit:

Toluene _____ 1 cubic decimetre.
TiCl₄ _____ 50 ccs., i.e. 0.45 mole.
Isobutyl alcohol _____ 5 cc.

The reactor was completely filled with this mixture which was circulated by the pump 30 at a temperature of 25° C. At the end of 2 hours, continuous feeding through the conduit 33 of the mixture of the above composition was commenced at the rate of 0.3 cubic decimetre/hour and withdrawal through the conduit 32 of the decanted suspension containing brown TiCl₃ and TiCl₄. The relative proportion of TiCl₃ and TiCl₄ depends on the temperature, the rate of recycling and the volume of the chamber 31 where decantation is effected. It can also be modified by changing the rate of feed and consequently the rate withdrawal, and furthermore by changing the concentration of TiCl₄ in the feed solution.

Isobutyl alcohol can be replaced by, for example, benzaldehyde, isoamyl ether, oleic acid, laurylamine hydrochloride, methylethyl ketone, benzoyl chloride, thionyl cholordie, phosphorus oxychloride and phosphorus pentachloride, the reduction then taking place in a similar manner, although the reduced products do not have the same properties.

The apparatus shown in FIGURE 4 can be modified in the following manner: in the body of the reactor 28 is suspended a container filled with the metal reducing agent, at least two walls of this container, for example the bottom and the upper wall, are perforated and covered with a metallic gauze which does not allow the pieces of metal reducing agent to pass. The liquid pumped by the pump 30 can thus circulate through the charge of metal reducing agent. The reaction rate is increased if the container containing the metal reducing agent is subjected to agitation or to vibrations by means, for example, of supports to which the container is attached.

In the four following examples certain of the products of the reduction according to the invention were used as constituents of cataylsts for the polymerization of alpha- olefins. These examples show well that the reduced transition metal halides obtained have particularly interesting properties as constituents of Ziegler catalysts.

*Example 25*

Ethylene was polymerized in 2 litres of heptane at 60° C. and at atmospheric pressure using the following catalytic mixture:

Suspension prepared according to Example 10: 2 millimoles of TiCl₃
Monochlorodiethylaluminum: 2 millimoles.

After 4 hours polymerization, 250 g. of polyethylene of intrinsic viscosity 2.5 were obtained. All the other products obtained in Examples 9–21 can be used for the polymerization of ethylene, giving similar results.

They can also be used with various dichloro-, sesquichloro- and monochloro-alkyl-aluminum compounds and trialkyl-aluminum compounds, the alkyl groups being ethyl, methyl, isobutyl etc., the results obtained are similar to those mentioned above, the only differences being in the weight of polymer formed and its intrinsic viscosity.

*Example 26*

Propylene was polymerized in 2 litres of heptane at 60° C. and at atmospheric pressure using the following catalytic mixture:

Suspension prepared according to Example 15: 6 millimoles of TiCl₃
Triethylaluminum: 8 millimoles.

After 4 hours polymerization, 90 g. of highly crystalline polypropylene of intrinsic viscosity 4.5 were obtained. It is possible to crush and wash the TiCl₃ before use.

*Example 27*

A mixture of ethylene and propylene containing 30 molar percent propylene was polymerized in 2 litres of cyclohexane at 60° C. and at atmospheric pressure, using the following catalytic mixture:

Suspension prepared according to Example 11: 6 millimoles of VCl₂
Triethylaluminum: 8 millimoles.

After 4 hours polymerization, 110 g. of copolymer were obtained of which less than 5% was insoluble in the polymerization medium.

It is possible to use diethylaluminum in place of triethylaluminum. Various additives can be used to alter the rate of polymerization or the stereo-specificity.

*Example 28*

A mixture of ethylene and α-butene containing 30 molar percent butene was polymerized in 2 litres of cyclohexane at 60° C. and at atmospheric pressure. The solvent had been put in equilibrium, before commencement of polymerization, with a gaseous ethylene/butene mixture containing 70 molar percent butene. This equilibrium was obtained by briskly agitating the solvent for 20 minutes while sweeping out air from the chamber with a free supply of the 70% butene gaseous mixture. The following catalytic mixture was then introduced:

Suspension prepared according to Example 9: 6 millimoles of TiCl₃
Triethylaluminum: 8 millimoles and the scavanging was stopped, all gas outlets were closed and the mixture containing 30% butene was admitted. The polymer obtained under these conditions had an average composition close to 30% butene, from the start, and at the end of 4 hours, 210 g. of almost totally soluble ethylene/butene copolymer were obtained.

The foregoing examples of the process according to the invention clearly show that in all the numerous cases mentioned, the use of an excess of reducing agent in granular pieces enables advantages to be obtained as compared with the known technique in which finely divided metals are used.

These advantages lie essentially in the fact that the product of the reduction can be very readily separated from the reducing agent without any risk of contamination. In addition the process requires easier and less troublesome operation because it avoids not only the necessity of separation, but also the necessity of subdividing the reducing agent. The largeness of the excess and the nature of the reducing agent also enable the temperature of the reduction to be controlled and the rate of reduction to be regulated to the desired value.

We claim:

1. A process comprising reducing a halogenated metallic compound with a reducing agent to product a substantially pure reduction product which is free of any traces of said reducing agent, the process including the steps of reacting in an anhydrous liquid medium, a metal selected from the group consisting of Al, Mg, Zn, and the alloys of aluminum and copper and aluminum and beryllium with a halogenated transition metallic compound selected form the group consisting of $TiCl_4$, $TiBr_4$, $TiI_4$, $VCl_4$, $VOCl_3$, $VOBr_3$, $MoCl_3$, $ZrCl_4$, $MoBr_4$, $MoF_6$, $MoOF_4$, and $CrO_2Cl_2$ at a temperature between 0 and 200° C. to reduce the halogenated compound to a compound in which the valence of the metallic atom is lowered, said metal which reduces the halogenated compound being present in the form of compact pieces, the smallest dimension of which is between 0.3 and 30 mm., and in an amount in excess of at least 30 times the stoichiometric quantity, and providing relative movement between the metal and the liquid medium to continually re-expose the surface of the metal by cleaning the surface of any coating which may be formed thereon, whereby the halogenated compound is reduced and is free of any traces of said reducing agent.

2. A process as claimed in claim 1 wherein the liquid medium is a liquid hydrocarbon solvent.

3. A process as claimed in claim 2 wherein said hydrocarbon solvent is an alkyl benzene.

4. A process as claimed in claim 1, wherein the metallic reducer compound is constituted by aluminum in pieces having dimensions comprised between 1 and 10 mm.

5. A process as claimed in claim 1, wherein the metal is aluminum and the reaction takes place in a solvent selected from the group consisting of benzene, toluene, xylene, and ethylbenzene, the solvent being present in a quantity between 10 and 100% of the weight of aluminum.

References Cited by the Examiner

UNITED STATES PATENTS

| | | | |
|---|---|---|---|
| 1,231,476 | 6/1917 | Bevilacqua | 23—286 X |
| 1,842,092 | 1/1932 | Harshaw | 23—286 |
| 2,374,453 | 4/1945 | Oliver et al. | 23—87 |
| 2,923,604 | 2/1960 | Fawley et al. | 23—286 |
| 2,927,105 | 3/1960 | Nienburg et al. | |
| 2,965,630 | 12/1960 | D'Alelio. | |
| 3,010,787 | 11/1961 | Tornqvist | 23—87 |
| 3,021,202 | 2/1962 | Peirce et al. | 23—286 |

FOREIGN PATENTS 342,208   1/1931   Great Britain.

OTHER REFERENCES

Koontz et al.: J. Ameri. Chem. Soc., vol. 70, pages 1936–37 (May 1948).

Stoddard et al.: Abstract, Official Gazette, vol. 631, page 883 (Feb. 21, 1950).

OSCAR R. VERTIZ, *Primary Examiner.*

GEORGE D. MITCHELL, MAURICE A. BRINDISI,
*Examiners,*

J. SCOVRONEK, E. STERN, *Assistant Examiner.*